R. C. FUNKE.
HAMMOCK STAND.
APPLICATION FILED DEC. 1, 1909.
950,070.
Patented Feb. 22, 1910.
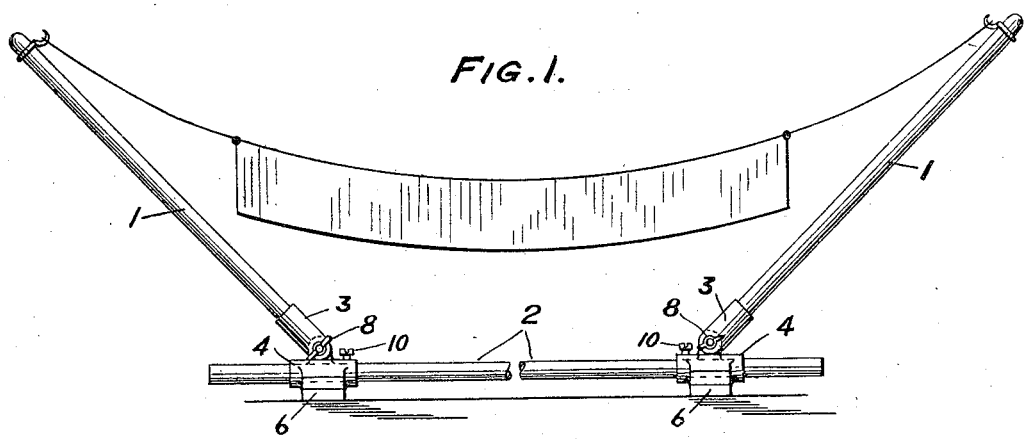
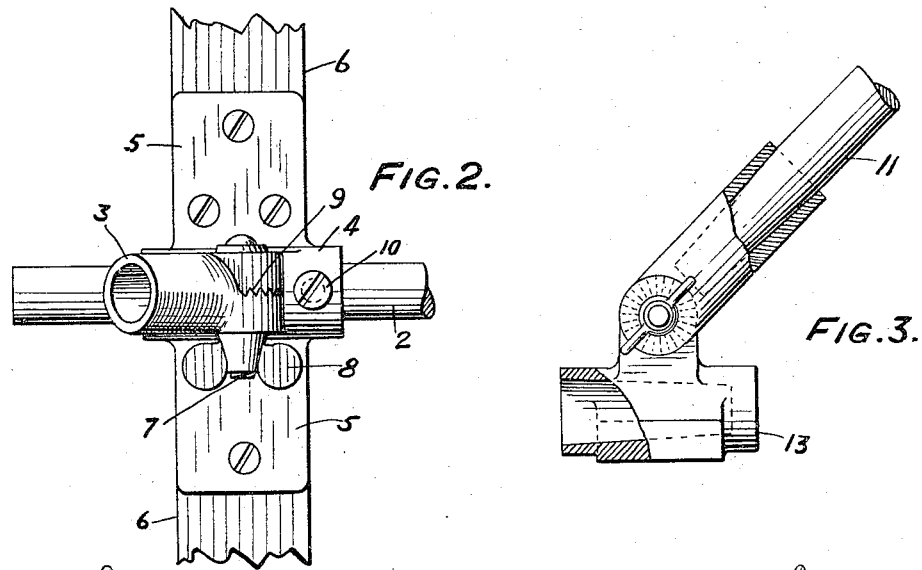
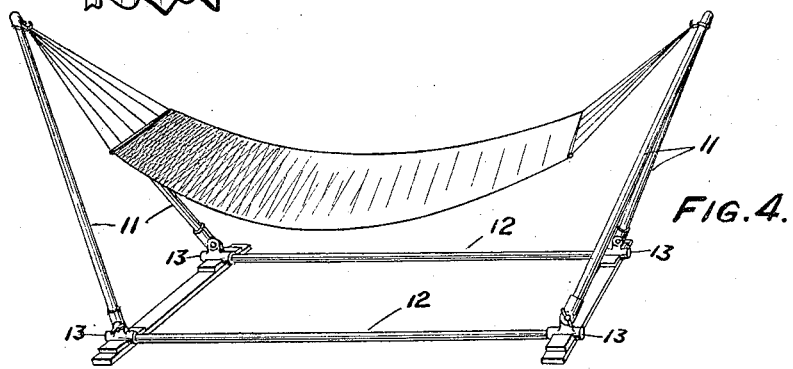
WITNESSES:
INVENTOR
Robert C. Funke
BY
Augustus B. Stoughton
ATTORNEY.

UNITED STATES PATENT OFFICE.

ROBERT C. FUNKE, OF PHILADELPHIA, PENNSYLVANIA.

HAMMOCK-STAND.

950,070.

Specification of Letters Patent. Patented Feb. 22, 1910.

Application filed December 1, 1909. Serial No. 530,836.

*To all whom it may concern:*

Be it known that I, ROBERT C. FUNKE, a citizen of the United States, residing at the city of Philadelphia, in the county of Philadelphia and State of Pennsylvania, have invented a certain new and useful Hammock-Stand, of which the following is a specification.

The principal object of the present invention is to provide a light, strong, comparatively inexpensive and sightly hammock stand which can be readily adjusted to accommodate hammocks of different sizes and lengths and to support the hammock in various positions.

The invention will be claimed at the end hereof but will first be described in connection with the embodiment of it chosen for illustration in the accompanying drawings in which—

Figure 1, is a side view of a stand embodying features of the invention. Fig. 2, is a top or plan view drawn to an enlarged scale of the left hand end of the stand shown in Fig. 1, with parts removed. Fig. 3, is a side view, partly in section, illustrating one of the end fittings embodying a modification of the invention and shown in Fig. 4, and Fig. 4, is a perspective view of a stand embodying a modification of the invention.

In the drawings, more particularly Fig. 1, 1, is a pair of supports arranged at an outward inclination, and 2, is a horizontal bar. Between each support and the bar is a fitting consisting of a socket member 3, and a hollow member 4, provided with wings 5, to which a cross piece 6, is secured. The members of this fitting are connected together and are made movable in respect to each other by a bolt 7, having a thumb nut 8. The meeting faces of the members 9, are serrated. The support 1, is fitted into a socketed member 3, and the horizontal bar passes through the hollow member 4. Set screws 10, are provided for clamping the fittings adjustably onto this bar. The thumb nuts afford means whereby the upper ends of the supports 1, may be adjusted toward and away from each other by turning the supports around the bolts 7. The set screws 10, afford means whereby the supports may be shifted bodily toward and away from each other by moving them along the horizontal bar 2. As shown in Figs. 3 and 4, two supports 11, connected at their tops are employed and two horizontal bars 12, are employed. Four end fittings are employed instead of two and the hollow member 13, of each of these is adapted to receive the end of a horizontal bar 12, which, however, may not pass through the hollow member as is the case in the construction shown in Fig. 1.

What I claim is:

1. In a hammock stand the combination of an end fitting consisting of a socket member and a hollow member having serrated abutting faces and a clamping bolt for adjustably connecting these members, a transverse support to which the hollow member is attached, a horizontal bar extending through the hollow member, a set screw by which the member is clamped to the bar, and a support carried by the socket member, substantially as described.

2. In a hammock stand the combination of an end fitting comprising a socket member and a hollow member having abutting serrated faces and a clamping nut by which these members are adjustably connected, a horizontal bar on which the hollow member is fitted, a support carried by the socket member, and a cross piece to which the hollow member is attached, substantially as described.

In testimony whereof I have hereunto signed my name.

ROBERT C. FUNKE.

Witnesses:
 CLIFFORD K. CASSEL,
 K. M. GILLIGAN.